March 22, 1955 O. J. GRAY, JR 2,704,674

TANDEM WHEEL SUSPENSION HAVING INDEPENDENT WHEEL MOUNTING

Filed April 14, 1954

INVENTOR

Owen J. Gray, Jr.

BY Mason, Fenwick & Lawrence

ATTORNEYS.

United States Patent Office 2,704,674

Patented Mar. 22, 1955

2,704,674

TANDEM WHEEL SUSPENSION HAVING INDEPENDENT WHEEL MOUNTING

Owen J. Gray, Jr., San Angelo, Tex.

Application April 14, 1954, Serial No. 423,019

4 Claims. (Cl. 280—104.5)

This invention relates to wheel mountings for vehicles, and particularly to such mountings wherein no through axle is employed but each wheel is independently mounted.

The object of the present ivnention is to provide a mounting for wheels arranged in tandem, wherein the wheels on each side of the vehicle are mounted so that vertical movement of one will be transmitted to the other and be counteracted, but the movements of the wheels one one side of the vehicle will have no effect upon the wheels on the other side.

A more specific object of the invention is to provide such a wheel mounting in which the various components supportng and controlling the wheels will have maximum length, to provide long pivoted levers whereby the apparatus will be delicately responsive to vertical wheel movement.

A further object of the invention is to provide a novel arrangement of pivotal connections to bring about the long leverage mentioned above.

Still more specific objects of the invention are to provide for improved lubrication of the moving parts, means to take up for wear and means to limit the movement of the wheels to prevent the equalizing mechanism from attaining a locking position.

A still further object of the invention is to provide a wheel mounting which may be used when tandem wheels are to be mounted centrally of the vehicle, with considerable overhanging forwardly and rearwardly of the wheels, which will maintain the vehicle on a substantially even keel irrespective of the weight distribution within the vehicle.

Other objects of the invention will become apparent from the following description of one practical embodiment thereof when taken in conjunction with the drawings which accompany, and form part of, this specification.

Figure 1:
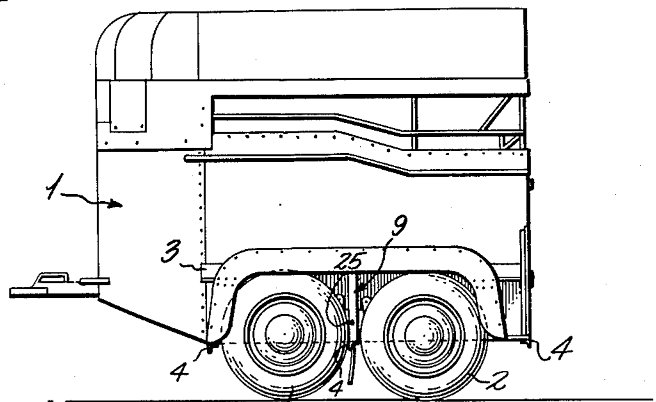
Figure 1 is a side elevation of a trailer having tandem wheels mounted centrally thereof upon mountings embodying the principles of the invention.

In general, the invention consists of a wheel mount for wheels arranged in tandem, having a pair of oppositely disposed pivoted arms for supporting the wheels and an equalizer mechanism interconnecting the free ends of the pivoted arms. The structure is mounted upon a vehicle with the pivots for the arms above the base of the vehicle body and, therefore, above the plane of the load-supporting floor of the vehicle, the pivot for the equalizer above the plane of the arm pivots, and the connection between the arms and the equalizer being above the pivot of the equalizer. There are no interconnecting axles between the wheels on opposite sides of the vehicle but the supporting structures for the wheel mountings are interconnected beneath the base of the vehicle to carry the load.

Referring to the drawings in detail, the invention is shown in conjunction with a trailer 1 particularly designed for transporting horses. The wheels 2 are mounted in pairs arranged in tandem on each side of the vehicle. The wheels are positioned rather close together near the center of the vehicle so that there is considerable overhang both at the front and rear.

A frame work to support the wheel mount is welded, or otherwise rigidly secured, to the sides and bottom of the trailer. This frame comprises an angle member 3 fixed to each side of the vehicle spaced from, and parallel to, the bottom. Transverse angle member 4 are secured in spaced parallel relation to the bottom of the vehicle and have their ends projecting beyond the sides. Vertical hanger plates 5 extend between, and are welded or otherwise secured to, the ends of the transverse members 4 and the outer edge of the horizontal flange of the angle members 3. Other vertical hanger plates 6 are also secured to the members 3 and 4, close to but slightly spaced from the side walls of the vehicle. Thus, the plates 5 and 6 form spaced supports between which the various movable elements of the wheel mount can be hung. The groups of plates 5 and 6 are equally spaced apart along the sides of the vehicle to form end hangers 7 and 8 and central hanger 9.

Pivotally mounted between the plates 5 and 6 of the end hangers 7 and 8 are wheel-suppotring arms 10 and 11. These arms are pivoted near one end and have their free ends projecting from the hangers toward the central hanger. At their free ends they are provided with transversely extending spindles 12 and 13 and vertical hub flanges 14 and 15. The hub flanges are provided with threaded studs 16 and 17 for securing the wheels 2 in place on the spindles. This arrangement will permit the wheels to move in a vertical plane about the pivots 18 and 19. These pivots may be in the form of axle bolts which pass through the arms 10 and 11 and the plates 5 and 6 making up the hangers. Suitable nuts will be threaded on the ends of the bolts to fasten the structure in position. It is contemplated that bearings will be mounted in the arm so that the arms will have free movement on the pivots. In order to provide proper spring action, the supporting arms carry leaf carriage springs 20 and 21 which are fixed to the arms by means of U bolts 22 and 23.

Figure 2:
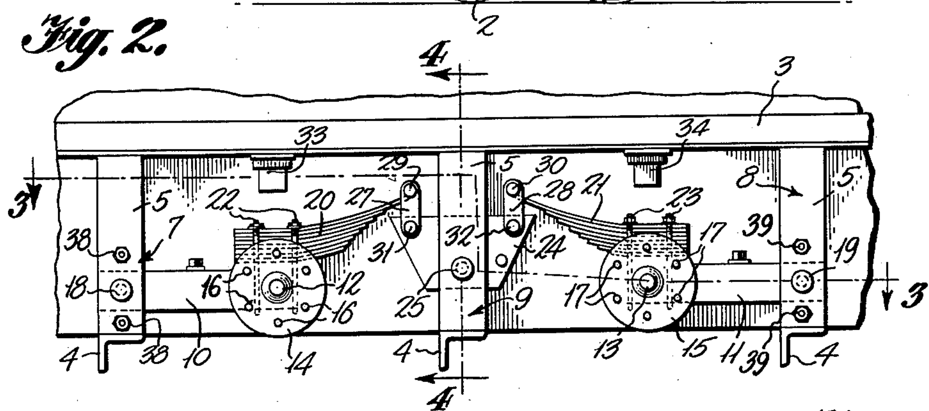
Figure 2 is a side elevation of the wheel mount connected to a vehicle but with the wheels removed.
Figure 3:
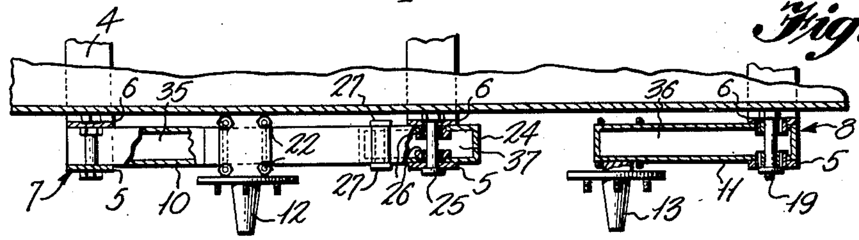
Figure 3 is a horizontal section through one side of a vehicle showing the wheel mount in place, and is taken on the line 3—3 of Figure 2; and, Figure 4 is a vertical section through the lower portion of the vehicle and wheel mount and is taken on the line 4—4 of Figure 2.
Figure 4:
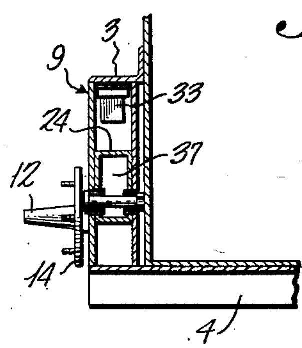
Figure 4:
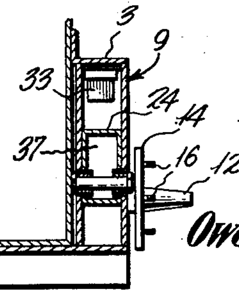

The springs, in effect, form continuations of the wheel-supporting arms to which they are attached and have their free ends interconnected through the medium of an equalizer 24. The equalizer is shown as an inverted truncated member pivotally connected between the plates 5 and 6 making up the central hanger 9. It is pivoted to the hanger in a manner similar to the mounting for the supporting arms 10 and 11. Its pivot bolt 25 passes through the plates 5 and 6 and the equalizer. Bearings 26 are provided around the pivot to provide free rocking movement for the equalizer. It is important that the pivot for the equalizer be positioned above the horizontal plane which passes through the wheel-supporting arm pivots. The free ends of the springs are connected to the equalizer on opposite sides of the pivot by means of links 27 and 28. Each link connection consists of a pair of links, with the limbs of each pair arranged on opposite sides of the equalizer and spring end and pivotally connected to the spring ends, as at 29 and 30, and to the equalizer 24, as at 31 and 32. It is to be noted that the pivot connections of the links to the equalizer 24 lie in a common horizontal plane when the parts are in their normal at-rest position, as shown in Figure 2, and that this plane is above the pivot 25 for the equalizer.

Due to the particular arrangement of the various pivots on different horizontal planes, the wheel-supporting arms can be of maximum length and the distance between the pivot for the equalizer and the pivotal connection of the links to the equalizer will represent lever arms of maximum length. By securing maximum length for these portions of the structure, the free ends of the arms travel greater distances under wheel movement and any slight movement of the supporting arms results in increased movement of the equalizer resulting in a structure which will be responsive to the slightest movement of the wheels, thus greatly increasing the effectiveness of the equalizer mechanism. By having the link pivots above the pivots for the equalizer these parts are on the top of an arc struck from the pivot axis of the equalizer giving a more delicate balance than would be the case if the pivots for the links were on diametrically opposite sides of the equalizer pivot. It is also to be noted that this arrangement of the pivotal parts puts all of the pivots above the bottom of the vehicle, which not only permits a much lower floor for the vehicle but places the weight supporting floor below the pivots of the wheel-supporting arms, thus hanging the weight from the wheels rather than supporting the weight upon the wheels in the normal fashion. This results in a much more stable mount and permits the vehicle to remain on an even keel even though there is an uneven weight distribution within the vehicle. In other respects the operation of the wheel mount will be similar to that of the conventional mount using a pivoted equalizer, in that vertical movement of one of the wheels in striking an obstruction in the roadway will result in movement of the equalizer and a tendency to move the other wheel in an opposite direction to divide the movement between the wheels and deliver less shock and vertical movement to the vehicle.

Due to the fact that the link connections to the equalizer are above the equalizer pivot it is necessary to limit the movement of the wheel-supporting arms to prevent undue movement of the equalizer and possible passing of the pivots beyond a dead center point and locking of the mechanism. For this purpose resilient stops 33 and 34 are mounted on the underside of the angle members 3 directly above the spring supports to serve as bumpers. These stops may be of resilient material and mounted in any conventional manner.

In order to lubricate the various pivotal connections, the wheel-supporting arms 10 and 11 and the equalizer 24 are made hollow to hold a supply of oil or grease. The chambers 35 and 36 in the wheel-supporting arms and the chamber 37 in the equalizer may be filled with lubricant. Any appropriate means may be employed for replenishing the supply of lubricant within these members.

The end hangers 7 and 8 are provided with adjusting bolts 38 and 39. The adjusting bolts in each member extend through the plates 5 and 6 above and below the pivotal connections for the arms. When wear occurs due to the movement of the supporting arms between the hanger plates, the bolts may be tightened to draw the plates into proper relation with the supporting arms so that side play or wobbling may be prevented.

While in the above one practical embodiment of the invention has been disclosed, it will be understood that the precise details of structure described and shown are merely for purposes of illustration and that various changes may be made within the scope of the appended claims.

What is claimed is:

1. In a vehicle tandem wheel mount, a frame including horizontal members mounted longitudinally along each side of the vehicle parallel to and spaced above the bottom of the vehicle, transverse members beneath the vehicle arranged in spaced and parallel relation and projecting beyond the sides of the vehicle, end hangers and a central hanger on each side of said vehicle each comprising a pair of spaced vertical plates parallel to the sides of the vehicle and extending between the ends of the transverse members and the longitudinal members, wheel-supporting arms pivotally mounted at one end between the vertical plates of each end hanger and above the bottom of the vehicle and having their free ends projecting toward the central hangers, a leaf spring connected to each arm and projecting toward the central hanger, an equalizer pivotally mounted between the vertical plates of each central hanger with the horizontal plane of the equalizer pivots being vertically spaced above a horizontal plane including the pivotal mountings of the arms, and links connecting the free end of the leaf springs to said equalizers, said links being pivotally connected to the equalizers at points equally spaced on opposite sides of the vertical center line of said equalizers and vertically spaced above the pivots of said equalizers.

2. In a vehicle tandem wheel mount as claimed in claim 1, stops mounted on the underside of said horizontal longitudinally extending members in the path of vertical movement of said arms to limit the vertical movement thereof.

3. In a vehicle tandem wheel mount as claimed in claim 1, said arms and equalizers having lubricant-receiving chambers therein, the pivotal mountings of said arms, equalizers and link connections to said equalizers including pivot shafts passing through said chambers.

4. In a vehicle tandem wheel mount as claimed in claim 1, bolts passing through the vertical plates forming the end hangers above and below said arms to adjust the bearing contact between said plates and said arms.

References Cited in the file of this patent

UNITED STATES PATENTS

| | | |
|---|---|---|
| 1,745,433 | Marcum | Feb. 4, 1930 |
| 2,104,284 | Wohlfarth | Jan. 4, 1938 |
| 2,139,547 | Kales | Dec. 6, 1938 |
| 2,446,877 | Jones | Aug. 10, 1948 |
| 2,518,733 | Walker | Aug. 15, 1950 |